United States Patent
Kidoguchi

(10) Patent No.: US 7,555,662 B2
(45) Date of Patent: Jun. 30, 2009

(54) TWO CONTROLLER COMMUNICATION CONTROL APPARATUS WITH POWER-SAVING CONTROL AND POWER-SAVING CONTROL METHOD

(75) Inventor: Kazuaki Kidoguchi, Soka (JP)

(73) Assignee: Ricoh Company Limited, Tokyo (JP)

( * ) Notice: Subject to any disclaimer, the term of this patent is extended or adjusted under 35 U.S.C. 154(b) by 441 days.

(21) Appl. No.: 11/375,105

(22) Filed: Mar. 15, 2006

(65) Prior Publication Data

US 2006/0236143 A1    Oct. 19, 2006

(30) Foreign Application Priority Data

Mar. 15, 2005    (JP)    ............... 2005-073805

(51) Int. Cl.
*G06F 1/32*    (2006.01)
(52) U.S. Cl. ...................... 713/323; 713/310
(58) Field of Classification Search ................. 713/310, 713/323, 324
See application file for complete search history.

(56) References Cited

U.S. PATENT DOCUMENTS 6,880,093 B1 *  4/2005  Lyles ......................... 713/300
7,016,213 B2 *  3/2006  Reeves et al. ................. 365/63
7,058,829 B2 *  6/2006  Hamilton ..................... 713/320
2004/0004732 A1 *  1/2004  Takeda et al. .............. 358/1.13

FOREIGN PATENT DOCUMENTS

| JP | 11-177743 | 7/1999 |
| JP | 2003-044184 | 2/2003 |
| JP | 2004-126959 | 4/2004 |

* cited by examiner

*Primary Examiner*—Thuan N Du
(74) *Attorney, Agent, or Firm*—Harness, Dickey & Pierce

(57) ABSTRACT

A communication control apparatus having a function for shifting a mode to a power-saving mode that suppresses the power consumption to the level thereof lower than that in a normal mode upon satisfying a given condition includes a normal-operation control mechanism and a power-saving control mechanism. The normal-operation control mechanism controls the operation in a normal mode. The power-saving control mechanism controls the operation at the minimum level thereof given as the operation in the power-saving mode with the power consumption lower than that in the normal mode. In this configuration, the power saving control mechanism is arranged independently of the normal-operation control mechanism.

13 Claims, 15 Drawing Sheets

TWO CONTROLLER COMMUNICATION CONTROL APPARATUS WITH POWER-SAVING CONTROL AND POWER-SAVING CONTROL METHOD

PRIORITY STATEMENT

This application claims priority to Japanese patent application no. 2005-073805 filed on Mar. 15, 2005 of which the entire contents are hereby incorporated by reference herein.

BACKGROUND OF THE INVENTION

1. Field of the Invention

Example embodiments of the present invention relate to a communication control apparatus having a function for communication with another apparatus connected to a network, for example, a network image processing apparatus including a printer, a scanner, a FAX machine, a copy machine, and/or an MFP (multi-function printer), a communication control system, a power-saving control method, a power-saving control program, and a recording medium for recording the program.

2. Description of the Related Art

There is conventional technology for power-saving that is realized by shutting-off power to portions of a device, excluding necessary and/or a minimum number of portions in an electronic device, when the electronic device is not used for a given time or more.

Recently, the environmental concerns of power saving have become more important.

An example background communication management apparatus on a network including a communication management apparatus receives a connection requesting packet to one information processing apparatus connected to the network, and subsequently sends a return request to another information processing apparatus at the partner destination. Further, the communication management apparatus may execute communication preparing processing with the one information processing apparatus on the request side in place thereof.

However, in a conventional communication control apparatus, such an attempt is performed such that power is saved by improving the efficiency of the operation of a normal-operation control unit for controlling the operation in a normal mode.

SUMMARY OF THE INVENTION

Example embodiments of the present invention provide a communication control apparatus, a communication control system, a power-saving control method, a power-saving control program, and a recording medium for recording the program, which reduce or are capable of reducing the power consumption in a power-saving mode in the communication control apparatus, as compared with the case of improving the efficiency of the operation of the normal-operation control unit.

According to an example embodiment of the present invention, there is provided a communication control apparatus having a function for shifting a mode to a power-saving mode that suppresses the power consumption to the level thereof lower than that in a normal mode upon satisfying a condition. The communication control apparatus includes a normal-operation controller that controls the operation in a normal mode and power-saving controller that controls the operation at the minimum level thereof given as the operation in the power-saving mode with the power consumption lower than that in the normal mode. The power saving controller is arranged independently of the normal-operation controller.

In an example embodiment, the power-saving controller may monitor a packet for sending so as to control the return operation for return the operation in the power-saving mode to that in the normal mode upon externally sending a packet that satisfies the given condition external to the apparatus, as the control operation at the minimum level given as the operation in the power-saving mode.

In an example embodiment, the monitoring operation of the received packet by the power-saving controller may determine whether or not address information on a sending side for sending the packet is included in a given value or range, and the packet is abandoned when the address information is not included in the given value or range.

In an example embodiment, the communication control apparatus may further include an external-device connecting unit that enables connection/disconnection of an electronic device external to the apparatus when the communication control apparatus is turned on. Furthermore, the power-saving controller may monitor the connection of the external-device connecting unit so as to control the return operation for returning the power-saving mode to the normal mode when the change in connection to the external-device connecting unit satisfies a given condition, as the control operation at the minimum level given as the operation in the power-saving mode.

In an example embodiment, the normal-operation controller may send, to the power-saving controller, determining information that is given to be used for determining a return condition from the power-saving mode in the shifting operation to the power-saving mode.

In an example embodiment, the power-saving controller may send, as the return control for returning the power-saving mode to the normal mode, return-reason specifying information and a packet, as a return trigger, to the normal-operation controller.

According to an example embodiment of the present invention, there is provided a communication control system, wherein a communication control apparatus according to an example embodiment of the present invention is connected to an operating device that is operable via a network to the communication control apparatus, via the network.

According to an example embodiment of the present invention, there is provided a power-saving control method comprising a power-saving mode shifting of shifting a mode to a power-saving mode for suppressing the power consumption to the level thereof lower than that in a normal mode upon satisfying a given condition, wherein the power-saving mode shifting shifts the control operation to power-saving controller arranged independently of normal-operation controller that controls the operation in the normal mode, and turns-off the normal-controller.

In an example embodiment, the power-saving control method may further include monitoring a packet for sending so that the power-saving controller controls the return operation for returning power-saving mode to the normal mode when a packet that satisfies a given condition is externally sent from the apparatus, after the power-saving mode shifting.

In an example embodiment, the packet monitoring may determine whether or not address information on a sending side for sending the packet is included in a given value or range, and may abandon the packet when the address information is not included in the given value or range.

In an example embodiment, the power-saving control method may further include monitoring the connection of external-device connecting unit that enables connection/disconnection of an external electronic device external to the apparatus while the apparatus is turned-on so that the power-saving controller controls the return operation for returning the operation in the power-saving mode to the operation in the normal mode when the change in the connection to the external-device connecting unit satisfies a given condition, after power-saving mode shifting.

In an example embodiment, in the power-saving mode shifting step, the normal-operation control means may send, to the powers-saving control means, determining information that is predetermined to be used for determining a return condition from the power-saving mode.

In an example embodiment, the power-saving control method may further include sending a return-reason specifying information and a packet, as triggers of the return, to the normal-operation controller by the power-saving controller when the power-saving mode is returned to the normal mode after power-saving mode shifting.

According to an example embodiment of the present invention, there is provided a power-saving control program that enables a computer to execute power-saving control processing according to example embodiments of the present invention in a communication control apparatus comprising a power-saving controller independently of normal-operation controller for controlling the operation in a normal mode.

According to an example embodiment of the present invention, there is provided a recording medium for recording the power-saving control program according to example embodiments of the present invention.

As mentioned above, according to example embodiments of the present invention, it is possible to reduce the power consumption in the power-saving mode in the communication control apparatus, as compared with the case of improving the efficiency of the operation of the normal-operation control unit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF EXAMPLE EMBODIMENTS

A specific description is given of a communication control apparatus, a communication control system, a power-saving control method, a power-saving control program, and a recording medium for recording the program according to embodiments of the present invention with reference to the drawings. The communication control apparatus according to example embodiments the present invention may be applied to an image processing apparatus, and the communication control system according to the present invention is applied to an image processing system.

Figure 1:
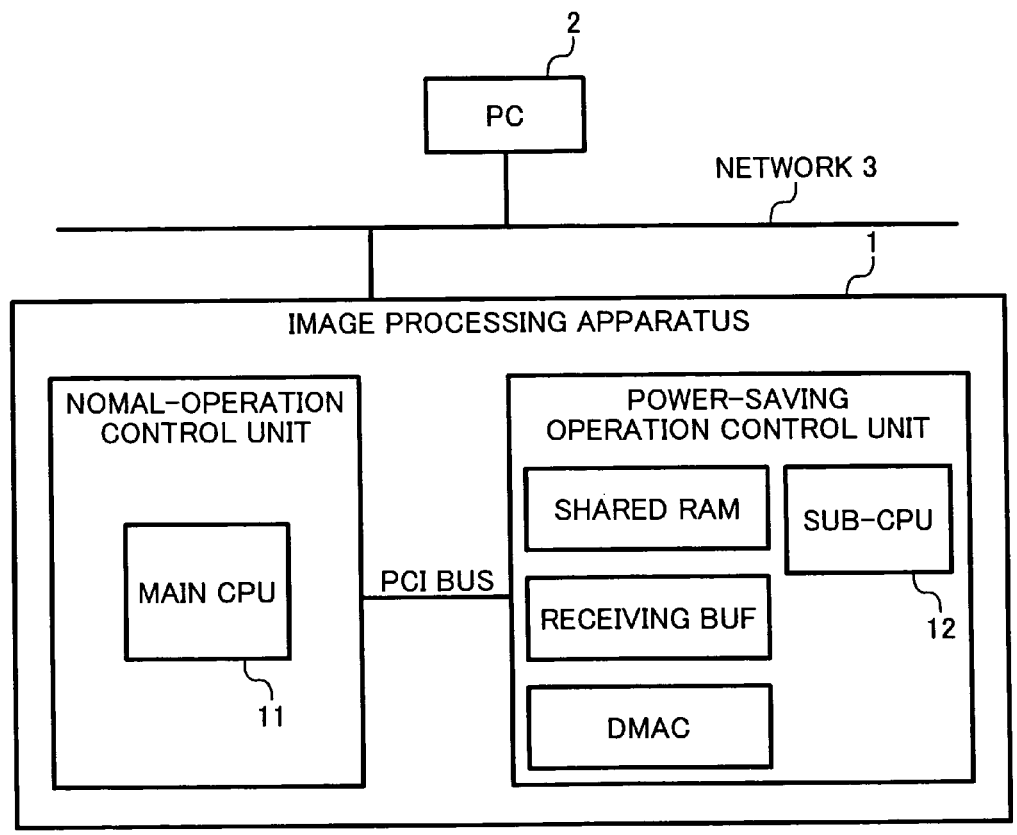
FIG. 1 is a block diagram showing a structure example of an image processing system according to an example embodiment of the present invention.

Referring to FIG. 1, an image processing system according to an example embodiment of the present invention includes an image processing apparatus 1 and a PC (Personal Computer) 2 which are connected via a network 3, for example, a LAN.

The image processing apparatus 1 may include a well-known component, serving as an image processing apparatus, e.g., a scanner unit or a printer unit (which are not shown), and may realize various image processing functions including image reading, FAX sending of the read image, printing of the received image data, reception and/or sending of an email, and copying.

Therefore, the image processing apparatus 1 may include, as its control structure, a normal-operation control unit that controls the operation in a normal mode for realizing and operating the above-mentioned image processing functions, and a power-saving operation control unit that controls the operation in a power-saving mode for reducing or suppressing the power consumption as compared with that in the normal mode. The normal-operation control unit and the power-saving operation control unit maybe connected to each other via a PCI bus.

The normal-operation control unit includes a Main-CPU (normal-operation control unit) 11 and an electronic device, and controls the operation of the above-mentioned image processing functions in the normal mode.

Figure 2:
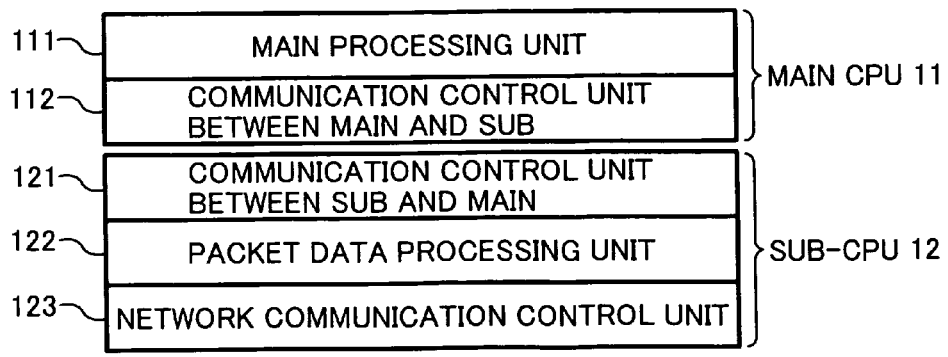
FIG. 2 is a diagram showing an example software structure of a Main-CPU and a Sub-CPU.

Referring to FIG. 2, the Main-CPU 11 may include, as its software structure, a Main processing unit 111 and a communication control unit 112 between Main and Sub. The Main processing unit 111 stores programs for realizing various operations of the image processing apparatus 1 in the normal mode, and controls various operations of the image processing apparatus 1 in the normal mode.

The power-saving operation control unit includes a Sub-CPU (power-saving control unit) 12, and electronic devices including a Shared RAM, a receiving BUF (buffer memory), and a DMAC (Direct Memory Access Controller). Further, the power-saving operation control unit controls the operation in the power-saving mode.

The reception BUF is a buffer memory that temporarily stores a packet received from the network 3.

Referring to FIG. 2, the Sub-CPU 12 may include, as its software structure, a communication control unit 121 between Sub and Main, a packet data processing unit 122, and a network communication control unit 123.

The communication control unit 121 between Sub and Main receives, from the communication control unit 112 between Main and Sub in the Main-CPU 11, determining information that is for the purpose of determining a return condition from the power-saving mode in the shifting operation to the power-saving mode. Further, the communication control unit 121 between Sub and Main sends return-reason specifying information including a number for specifying the return reason and a packet which becomes a return trigger to the communication control unit 112 between Main and Sub in the Main-CPU 11, in the return time for returning the mode from the power-saving mode to the normal mode.

The packet data processing unit 122 may perform predetermined filtering processing of the packet received via the network 3 from the PC 2 in the power-saving mode, and determine whether or not the mode is returned to the normal mode.

The network communication control unit 123 receives the packet from the network 3 in the power-saving mode. That is, the image processing apparatus 1 includes a communication interface unit (an external interface device) (not shown) that externally receives data, and the image processing apparatus 1 can communicate the data therewith via the network 3. The network communication control unit 123 performs processing for sending, to the packet data processing unit 122, the externally-received packet, e.g., from the PC 2 via the network 3.

The Sub-CPU 12 is turned-on for operation, only in the power-saving mode, in the shifting operation to the power-saving mode, and in the return time from the power-saving mode to the normal mode.

The Main-CPU 11 is turned-off in the power-saving mode.

As mentioned above, the image processing apparatus 1 according to an example embodiment includes two CPUs, for example, the Main-CPU 11 and the Sub-CPU 12 that stops the Main-CPU 11 by the shifting operation to the power-saving mode when a given condition is satisfied, and the image processing apparatus 1 can communicate data via the network.

The power-saving mode may include a suspend mode, a standby mode, and/or a pause mode, and may suppress the power consumption to a lower level even in the on-power, as compared with the power consumption in the normal mode.

The PC (operating device) 2 may include, as PC well-known components, a control unit, a memory unit, a display unit, an input unit, and a network 1/F (interface) which are not shown, and realizes a function for inputting the operation to the image processing apparatus 1 via the network 3. As a consequence thereof, the PC 2 includes a function for sending the operating content, as packet data, to the image processing apparatus 1 via the network 3.

Next, a description is given of the operation of the image processing system according to an example embodiment.

Figure 3:
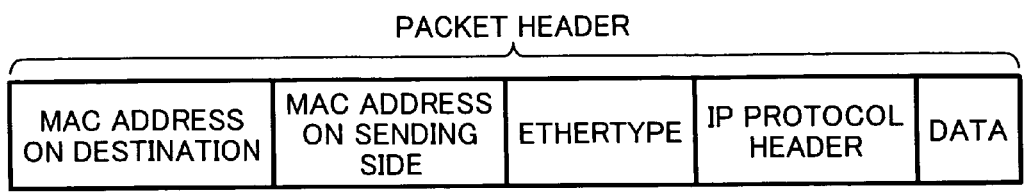
FIG. 3 is a diagram showing an example structure of a packet header including a DLC protocol header.
Figure 4:
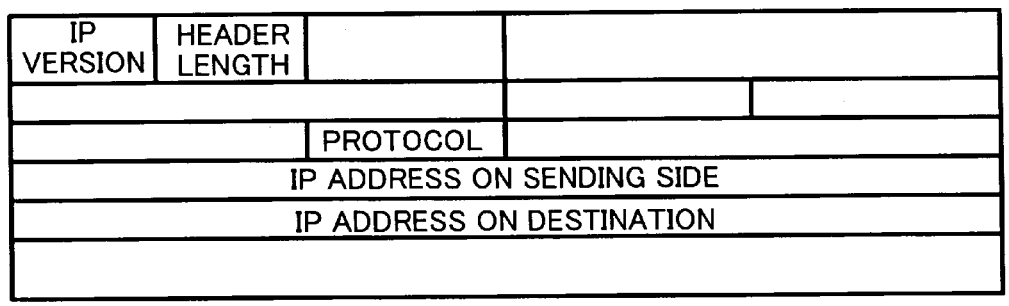
FIG. 4 is a diagram showing an example structure of an Ipv4 protocol header.
Figure 5:
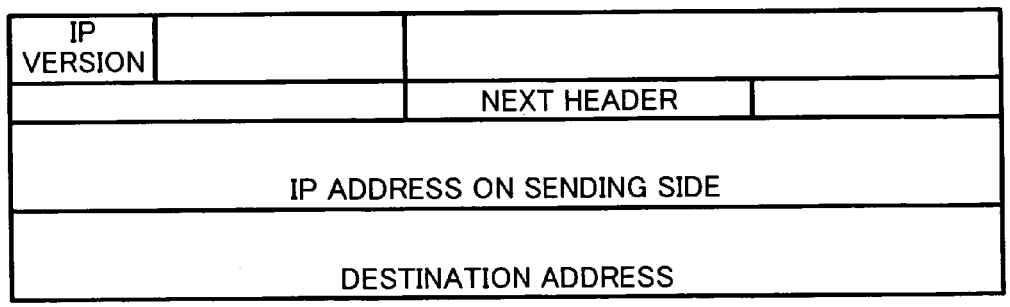
FIG. 5 is a diagram showing an example structure of an Ipv6 protocol header.
Figure 6:
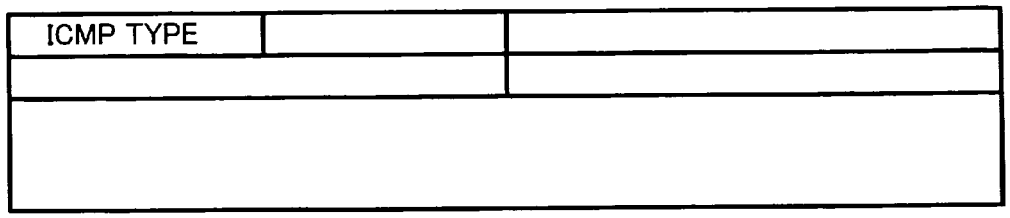
FIG. 6 is a diagram showing an example structure of ICMP packet data.

FIG. 3 is a diagram showing an example structure of a packet header, and FIGS. 4 to 6 are diagrams showing an example data structure of protocols. FIG. 4 shows an example structure of an Ipv4 protocol header, FIG. 5 shows an example structure of an Ipv6 protocol header, and FIG. 6 shows an example structure of ICMP packet data.

Figure 7:
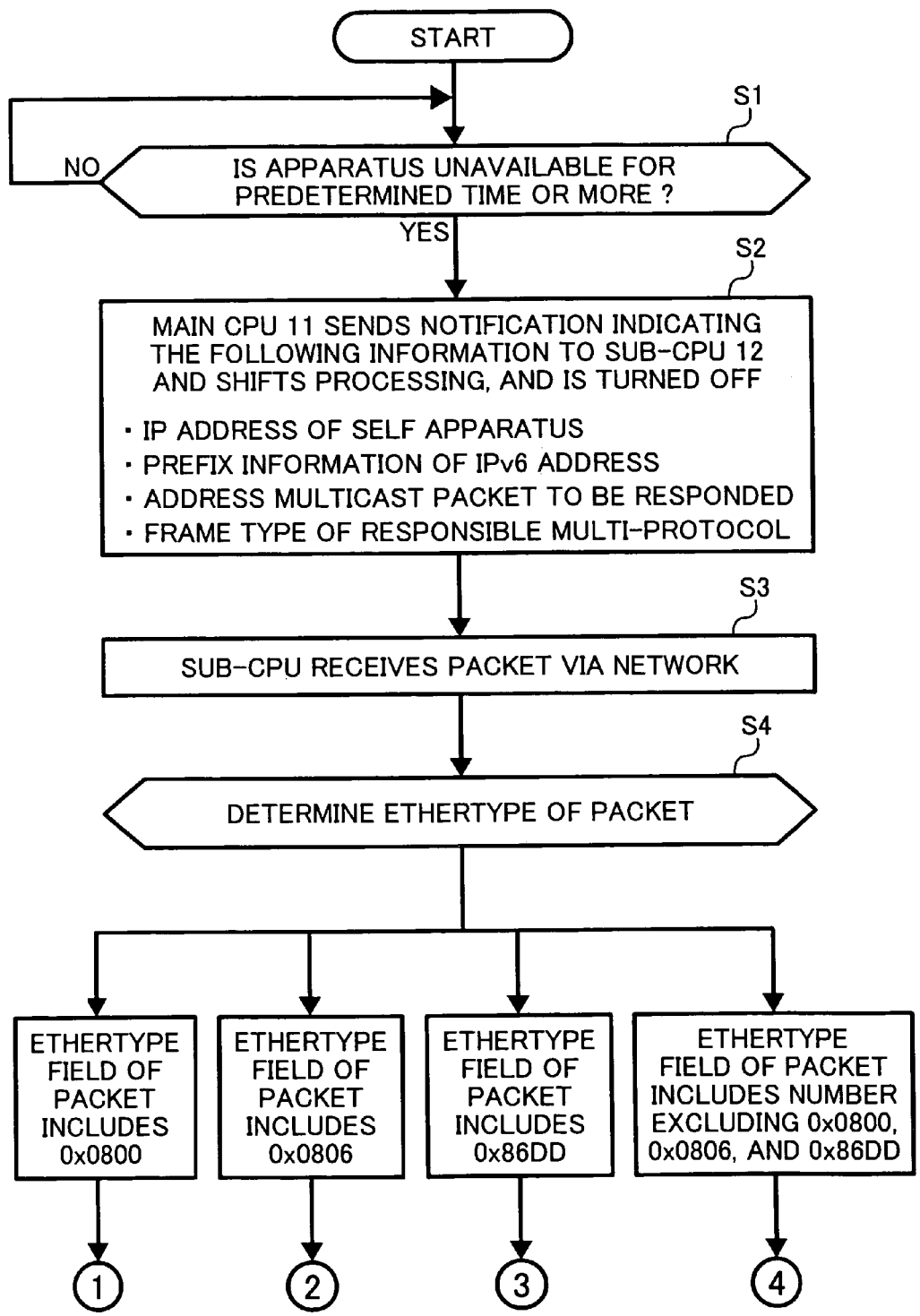
FIG. 7 is a flowchart showing an example of shifting processing to a power-saving mode and Ethertype determining processing.

First, a description is given of the transition processing to the power-saving mode with reference to an example flowchart shown in FIG. 7.

The Main-CPU 11 determines that a condition for the shifting operation to the power-saving mode is satisfied when an operation is not externally inputted for a given time or more that is preset to the apparatus, and starts the shifting processing to the power-saving mode (YES at S1).

As the shifting processing to the power-saving mode, the Main-CPU 11 sends data to the communication control unit 121 between Sub and Main from the communication control unit 112 between Main and Sub, further sends a notification indicating the shifting operation to the power-saving mode and a notification indicating the following network control information (determining information for determining a return condition) to the Sub-CPU 12, and shuts-off the Main-CPU 11 (at S2).

IP address of the self apparatus

Prefix information of the IPv6 address

Address of Multicast packet to be responded to

Frame type of responsive multi-protocol

Thus, in the power-saving mode, the Sub-CPU 12 receives the packet sent from the PC 2 via the network 3 by the network communication control unit 123 (at S3), the packet data processing unit 122 analyzes Ethertype-field information in a DLC header shown in FIG. 3, of the received packet (at S4).

Figure 8:
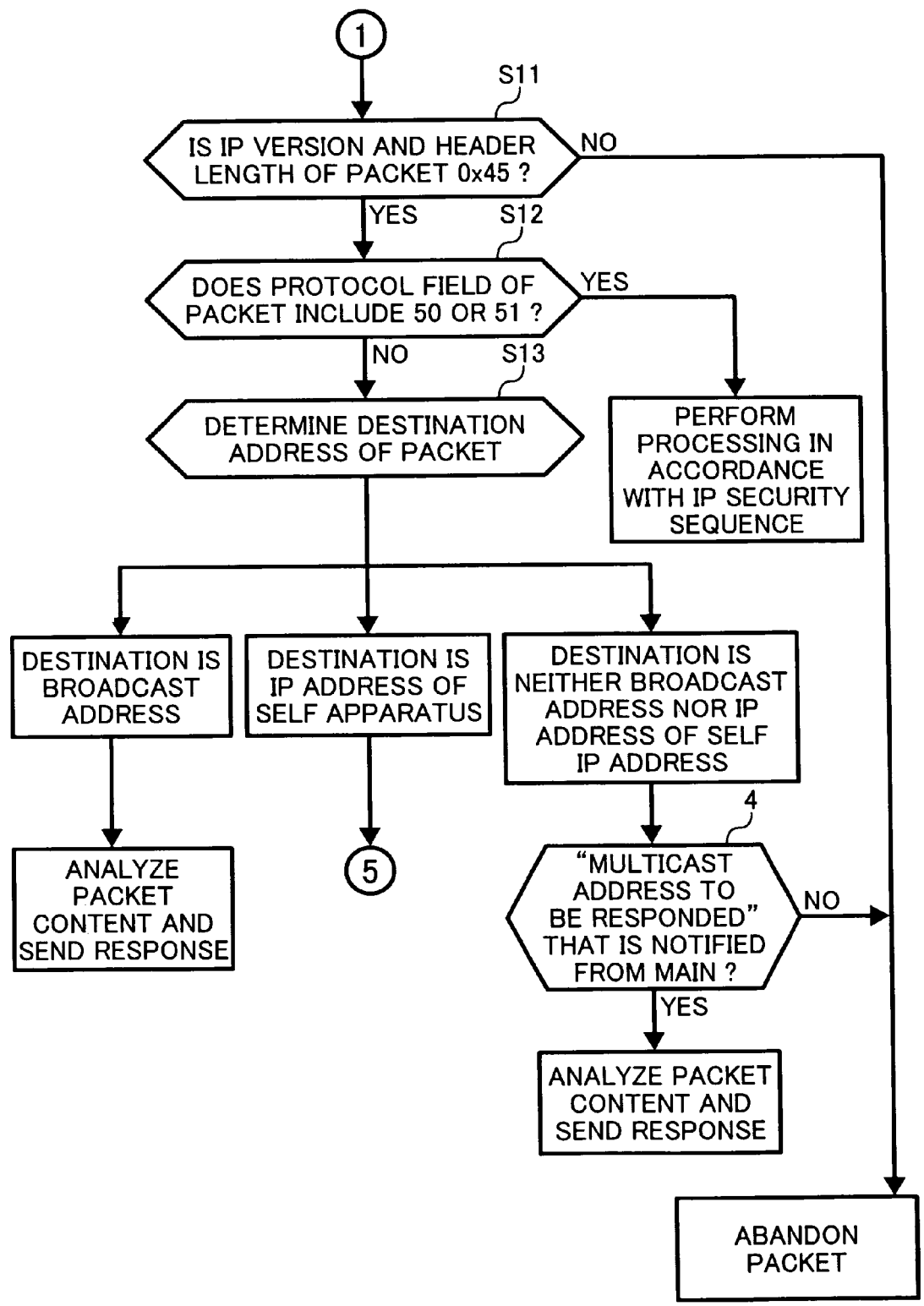
FIG. 8 is a flowchart showing a filtering processing example in a power-saving mode.

A description is given of the operation upon determining at S4 that the Ethertype field includes 0x0800 with reference to FIG. 8.

When the Ethertype field includes 0x0800, the packet is an IPv4 packet. Therefore, if the IP version in the IP protocol header and a header length are not 0x45, the packet is abandoned (at S11).

When the IP version and the header length are 0x45, the protocol field in the IPv4 protocol header shown in FIG. 4 is referred to. When the protocol field includes 50 or 51, the packet is an IP security one. Therefore, processing corresponding to the IP security standard is performed.

When the protocol field includes a number other than 50 and 51, the destination address of the packet is referred to (at S12 and S113).

When the destination is a broadcast address, the Sub-CPU 12 analyzes the packet content and sends a response.

When the destination is neither the broadcast address nor the IP address of the self apparatus, it is determined whether or not the address is the Multicast address notified from the Main-CPU 11 at S2 (at S14). When the address is the Multicast address to be responded to, the packet is processed and a response is sent. When the address is not the Multicast address to be responded, the packet is abandoned.

Figure 9:
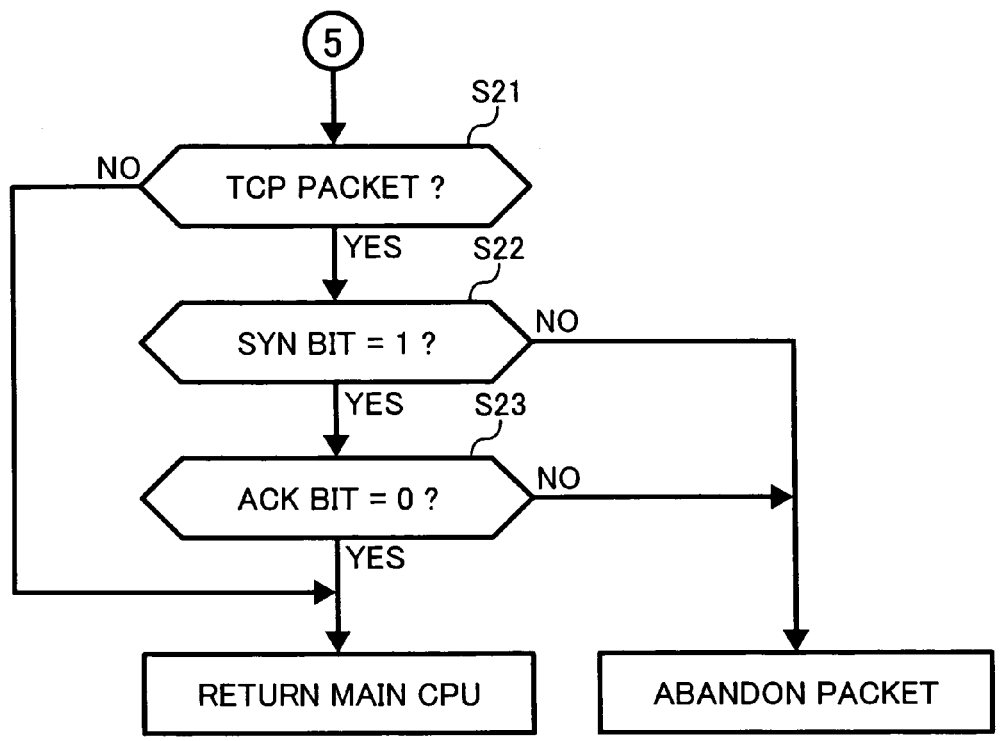
FIG. 9 is a flowchart showing another filtering processing example in the power-saving mode.

A description is given of the operation upon determining at S13 that the destination address of the packet is the same as the IP address of the self apparatus with reference to FIG. 9.

When the destination address is the same as the IP address of the self apparatus, the Sub-CPU 12 refers to the protocol field in the IPv4 header and determines whether or not the protocol field includes "6" indicating a TCP packet (at S21). When the protocol field does not include the TCP packet, the Main-CPU 11 is returned to the normal mode and the packet is sent to the Main-CPU 11.

When the protocol field includes the TCP packet, the Sub-CPU 12 determines whether or not an SYN bit is 1. When it is determined that the SYN bit is not 1, the packet is abandoned (at S22).

When it is determined that SYN bit is 1, it is determined whether or not an ACK bit is 0. When it is determined that the ACK bit is not 0, the packet is abandoned (at S23).

When the packet includes the SYN bit of 1 and the ACK bit of 0, the Main-CPU 11 is returned to the normal mode and the packet is sent to the Main-CPU 11.

Figure 10:
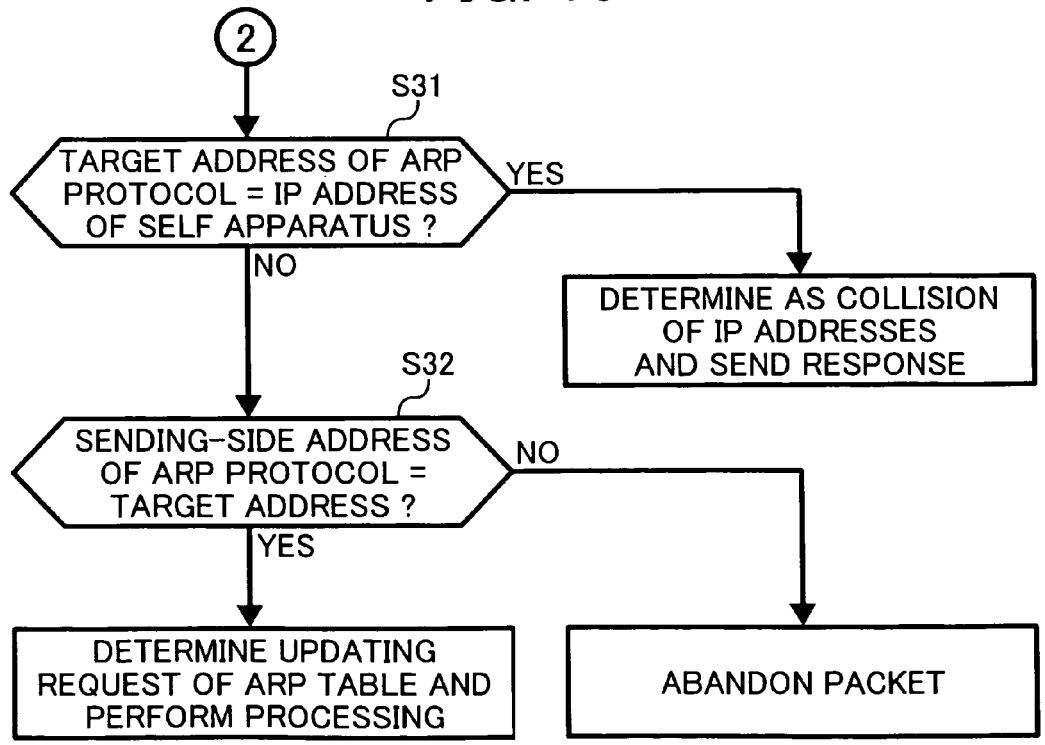
FIG. 10 is a flowchart showing another filtering processing example in the power-saving mode.

A description is given of the operation upon determining at S4 that the Ethertype field includes 0x0806 with reference to FIG. 10.

When it is determined that the Ethertype field in the DLC header shown in FIG. 3 of the received packet includes 0x0806, the Sub-CPU 12 determines that the packet is a packet of an ARP protocol.

When a target address of the ARP protocol is the IP address of the self apparatus, collision of IP addresses is determined and the response based on the determination is sent (at S31).

When the address on the sending-side matches the target address, an ARP-table updating request is determined and processing is performed (at S32). When the address on sending-side does not match the target address, the packet is abandoned.

Figure 11:
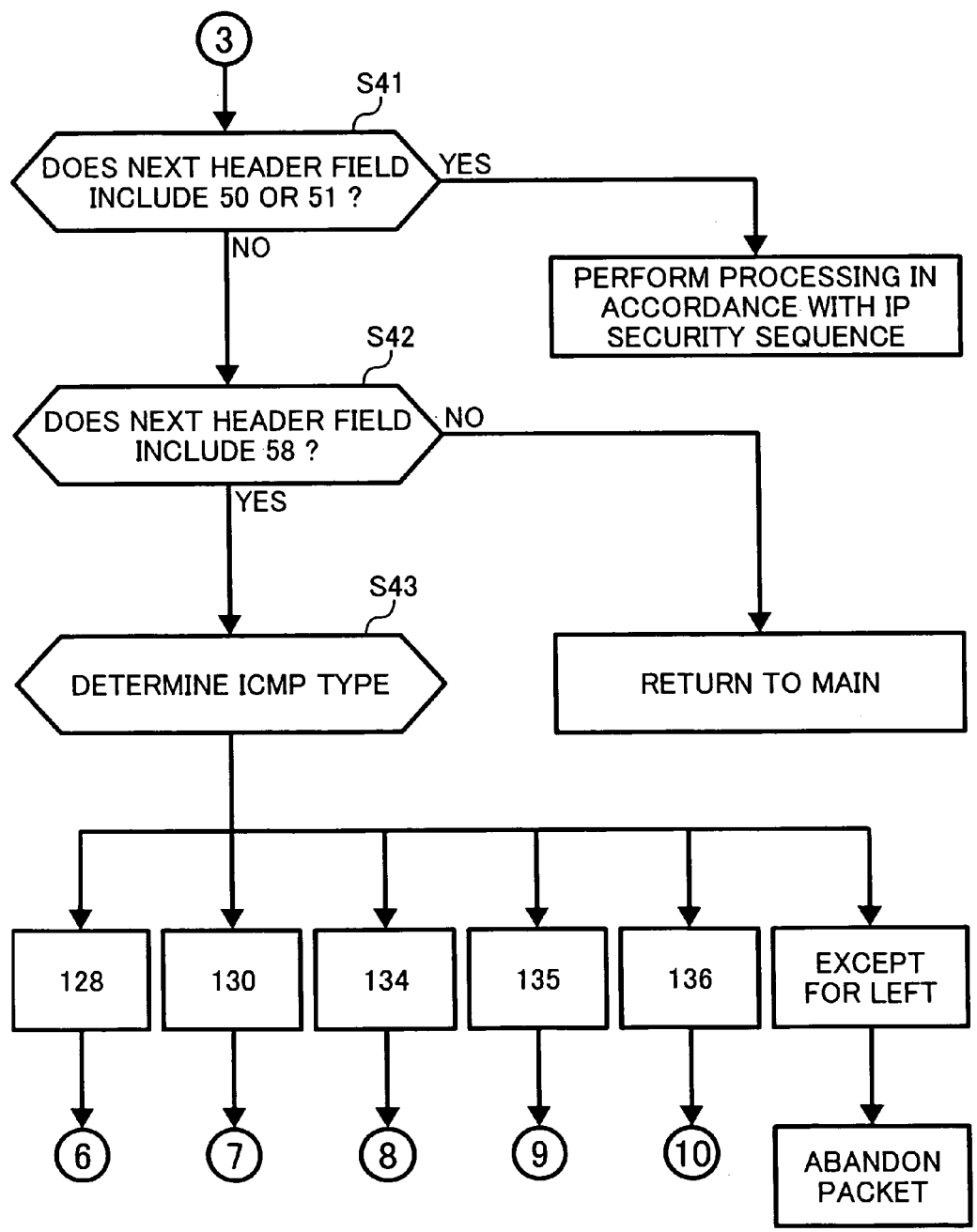
FIG. 11 is a flowchart showing another filtering processing example in the power-saving mode.

A description is given of the operation upon determining at S4 that the Ethertype field includes 0x86DD with reference to FIG. 11.

When it is determined that the Ethertype field in the DLC header shown in FIG. 3 of the received packet includes 0x86DD, the Sub-CPU 12 determines that the sent packet is the packet of the IPv6 protocol.

Therefore, a Nextheader field in the IPv6 protocol header shown in FIG. 5 includes 50 or 51, the packet is the IP security packet. Therefore, processing corresponding to the IP security standard is performed (at S41).

When the Nextheader field includes 58, it is determined that the packet is an ICMPv6 packet and it is determined whether or not the packet is the ICMP-type one (at S42 and S43). When it is determined that the Nextheader field does not include any of 50, 51, and 58, the operation is returned to the normal mode.

Figure 12:
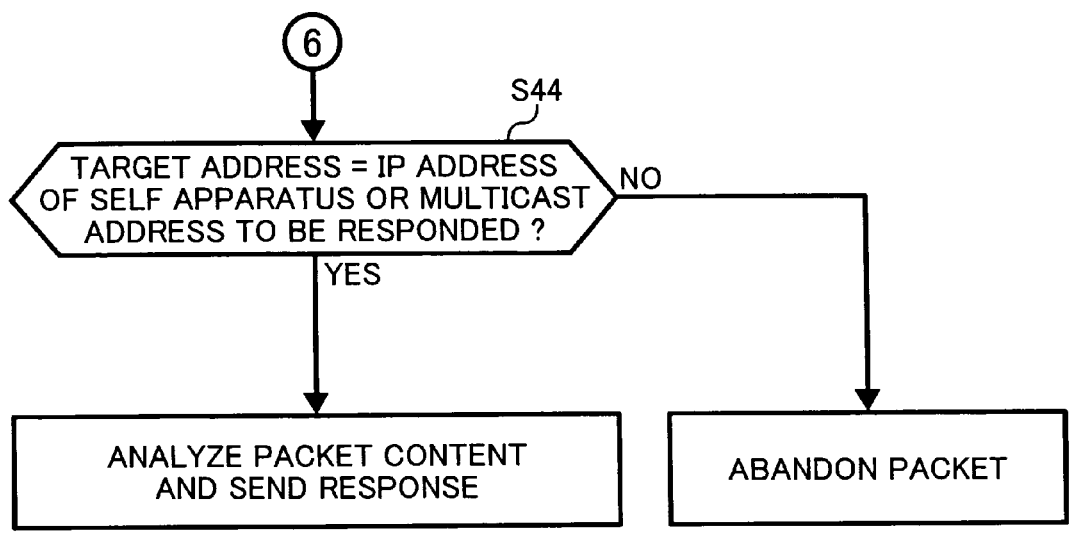
FIG. 12 is a flowchart showing another filtering processing example in the power-saving mode.

When it is determined at S43 that the Nextheader field includes a type 128 of the ICMPv6 data shown in FIG. 6, referring to FIG. 12, the Sub-CPU 12 determines the target address. When it is determined that the target address is the IP address of the self apparatus or Multicast address to be responded to, the packet content is analyzed and the response processing is performed. When it is determined that the target address is neither the IP address of the self apparatus nor Multicast address to be responded to, the packet is abandoned (at S44).

Figure 13:
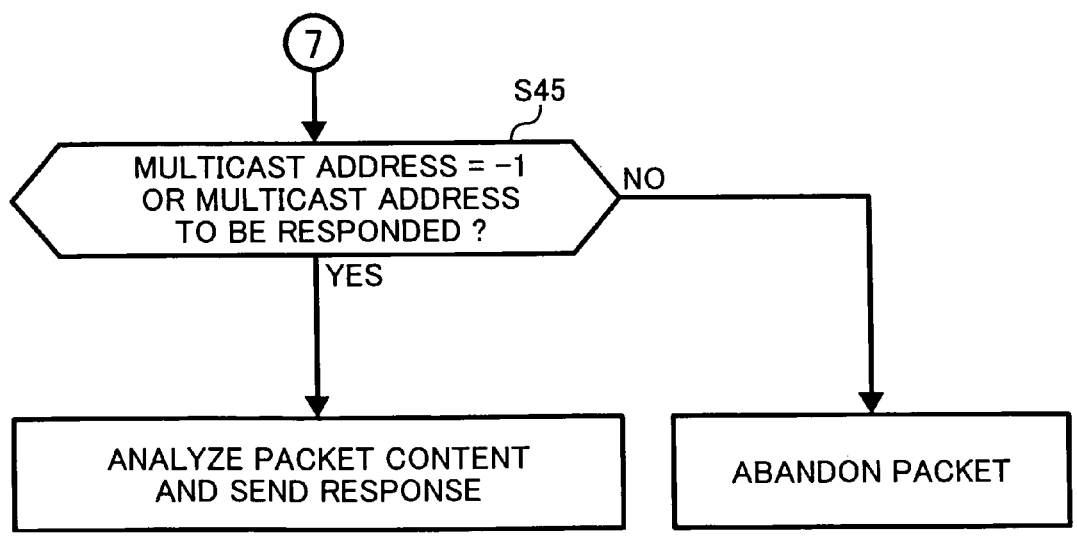
FIG. 13 is a flowchart showing another filtering processing example in the power-saving mode.

When it is determined at S43 that the Nextheader field includes a type 130 or the ICMPv6 data shown in FIG. 6, referring to FIG. 13, the Sub-CPU 12 determines the target address. When it is determined that the target address is −1 or the Multicast address to be responded to, the packet content is analyzed and the response processing is performed. When it is determined that the target address is neither −1 nor the Multicast address to be responded, the packet is abandoned (at S45).

Figure 14:
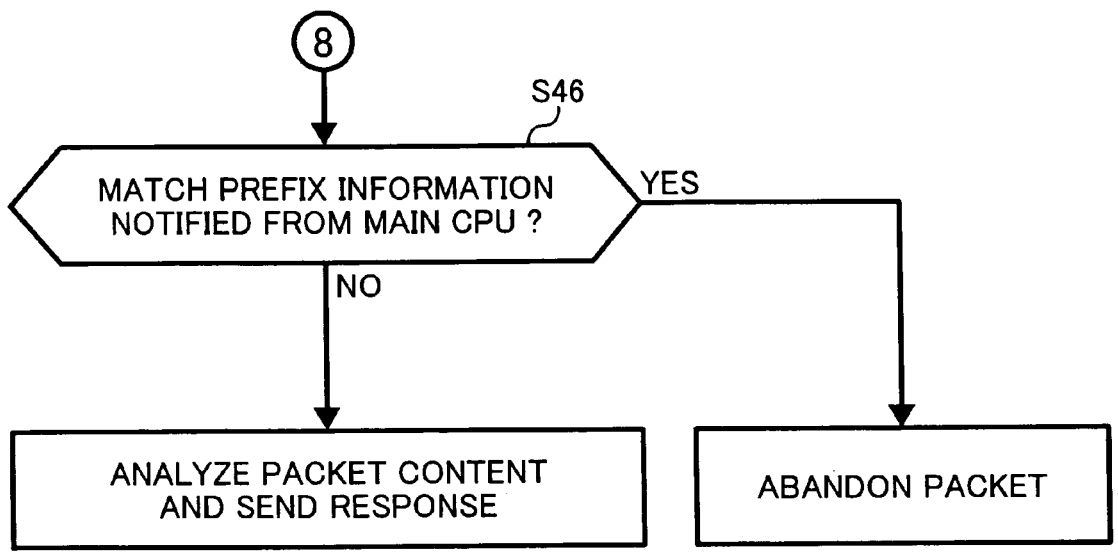
FIG. 14 is a flowchart showing another filtering processing example in the power-saving mode.

When it is determined at S43 that the Nextheader field includes a type 134 of the ICMPv6 data shown in FIG. 6, referring to FIG. 14, the Sub-CPU 12 compares the prefix information of the packet with the prefix information notified from the Main-CPU 11 at S2 (at S46).

When the prefix information of the packet does not match the prefix information notified from the Main-CPU 11 at S2, it is assumed that the change of the prefix information is notified and the response is sent. When the prefix information of the packet matches the prefix information notified from the Main-CPU 11 at S2, the packet is abandoned.

Figure 15:
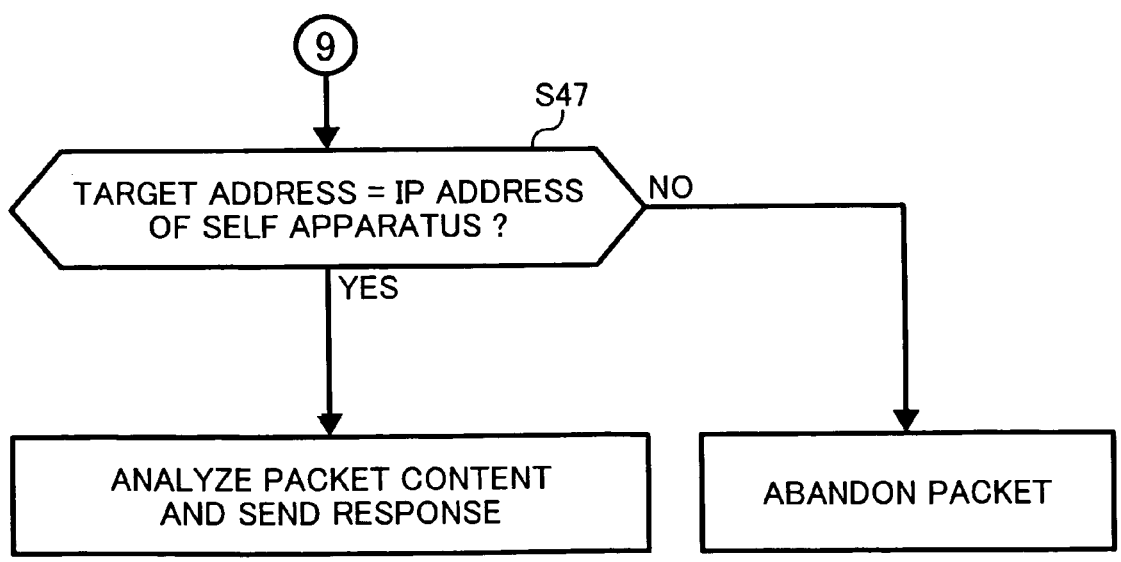
FIG. 15 is a flowchart showing another filtering processing example in the power-saving mode.

When it is determined at S43 that the Nextheader field includes a type 135 of the ICMPv6 data shown in FIG. 6, referring to FIG. 15, the Sub-CPU 12 determines the target address. When it is determined that the target address is the IP address of the self apparatus, the packet content is analyzed and the response processing is performed. In cases other than this, the packet is abandoned (at S47).

Figure 16:
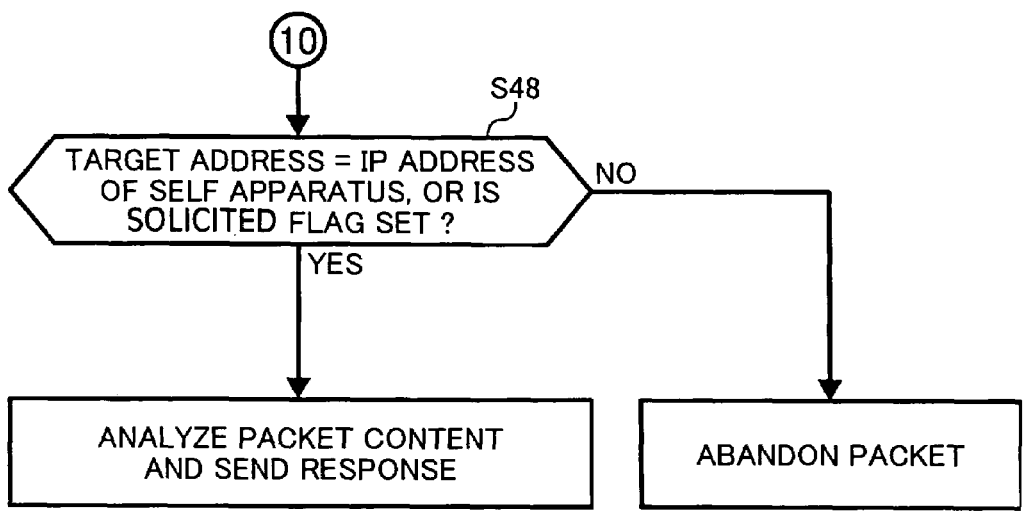
FIG. 16 is a flowchart showing another filtering processing example in the power-saving mode.

When it is determined at S43 that the Nextheader includes a type 136 of the ICMPv6 data shown in FIG. 6, referring to FIG. 16, when it is determined the target address is the IP address of the self apparatus or a solicited flag indicates "1", the Sub-CPU 12 analyzes the packet content and performs the response processing. In cases other than this, the packet is abandoned (at S48).

Figure 17:
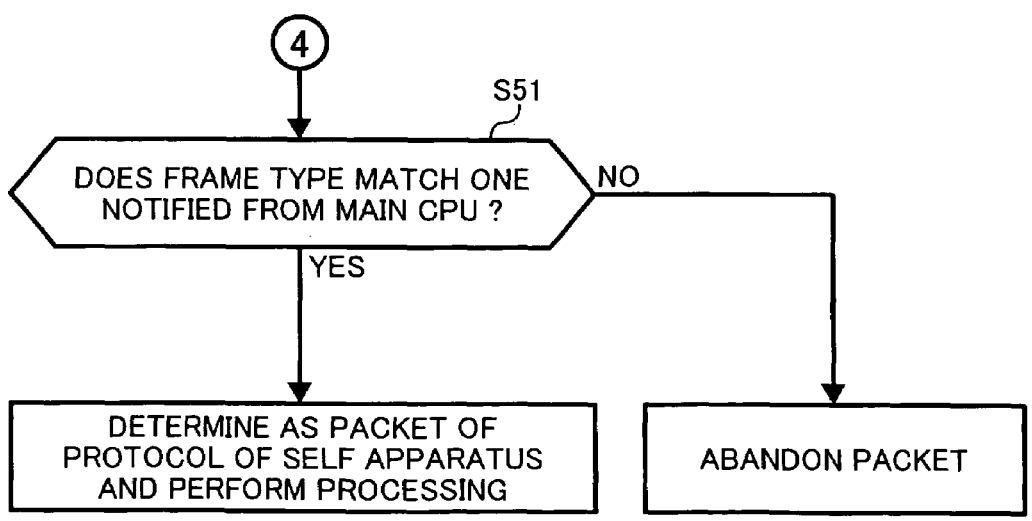
FIG. 17 is a flowchart showing another filtering processing example in the power-saving mode.

A description is given of the operation upon determining at S4 that Ethertype field includes a number other than 0x800, 0x0806, and 0x86DD with reference to FIG. 17.

When the Ethertype field in the DLC header shown in FIG. 3 of the received packet does not include any of 0x800, 0x0806, and 0x86DD and the Ethertype field in the DLC header includes a number larger than 0x0800, the Sub-CPU 12 abandons the sent packet.

When the Ethertype field includes a number other than 0x0800, 0x0806, and 0x86DD, the frame type of the packet is determined. When the frame type matches a frame notified from the Main-CPU 11 at S2, the Ethertype field is determined as a packet of the used protocol and the processing is performed. When the frame type does not match the frame notified from the Main-CPU 11 at S2, the packet is abandoned (at S51).

According to an example embodiment, in addition to the above-mentioned functions, a timer value may be preset and a function for returning the operation to the normal mode after the passage of a set time from the shifting operation to the power-saving mode may be provided.

With the function, the Main-CPU 11 further adds a timer value for return to the normal-operating mode, as network control information (determining information) sent to the Sub-CPU 12 at S2 in the shifting operation to the power-saving mode. The timer value for return may be preset and, alternatively, may be preset by a user.

Figure 18:
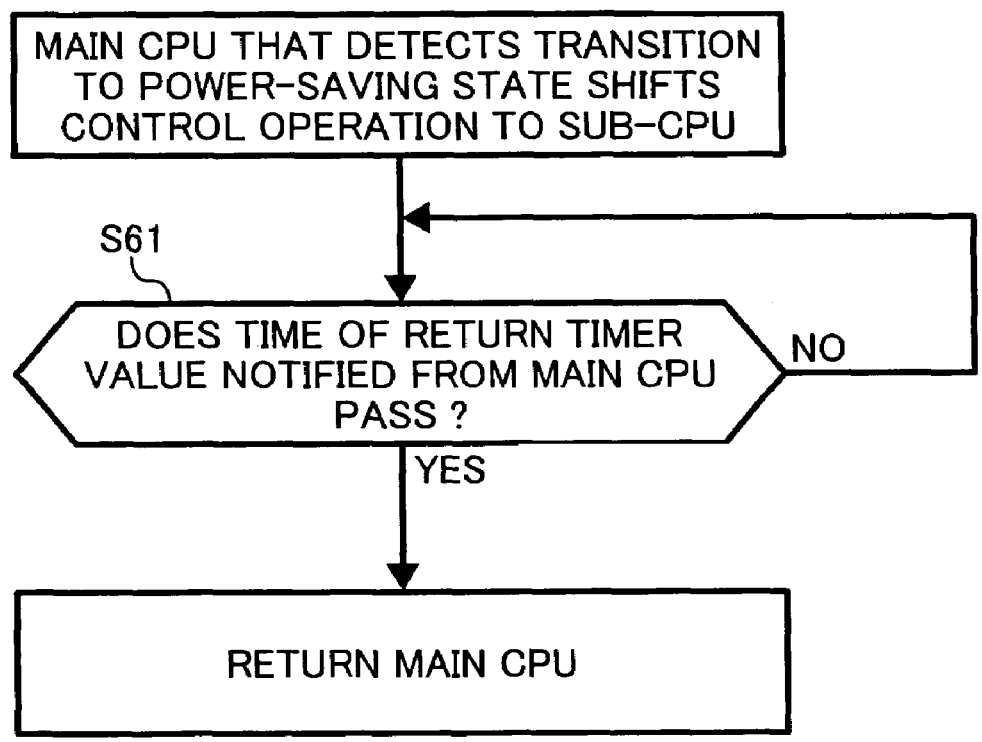
FIG. 18 is a flowchart showing another filtering processing example in the power-saving mode.

A description is given of the operation with the returning function using the timer value with reference to a flowchart shown in FIG. 18.

The Sub-CPU 12 in the power-saving mode determines whether or not a time of the timer value notified from the Main-CPU 11 passes (at S61).

When it is determined that the time of the timer value passes, the Sub-CPU 12 returns the Main-CPU 11 to the normal mode. When it is determined that the time of the timer value does not pass, the monitoring of the packet received in the filtering processing continues.

As mentioned above, according to an example embodiment of the present invention, the Sub-CPU 12 for controlling the power saving is arranged, independently of the Main-CPU 11 for control operation in the normal mode. In the power-saving mode, the Main-CPU 11 is turned-off. Therefore, the power consumption in the power-saving mode may be reduced or suppressed, as compared with the structure for power-saving in the power-saving mode with one CPU that controls both the operation in the normal mode and the operation in the power-saving mode.

In other words, power saving consumption is conventionally achieved with one Main-CPU. According to an example embodiment, the limit of the power saving to one Main-CPU is overcome and the power consumption in the power-saving mode can be extremely reduced.

In general, when the power is saved in the power-saving mode with one CPU that controls the operation in the normal mode and the operation in the power-saving mode, the power of unnecessary portions other than the CPU is shut off when the apparatus is not used. Thus, the power consumption of the CPU becomes the limit of the power consumption. However, the CPU has the entire functions and performance provided by the apparatus. Therefore, relatively large power is consumed.

An example embodiment is devised in consideration of the drawback. Without using the apparatus, the processing shifts to that of the Sub-CPU with low power-consumption and with necessary and minimum performance. A packet to be processed by the Sub-CPU is selected, and the Main-CPU can be shut-off in the case excluding the necessary case of the Main-CPU.

Thus, in the control operation both in the normal mode and in the power-saving mode with one CPU, the power consumption may be reduced or suppressed in the power-saving mode, as compared with the power saving due to the shut-off operation to an unnecessary portion in the power-saving mode.

Recently, a CPU with a relatively low processing-speed can be obtained at a low price. Therefore, even when the Sub-CPU 12 is arranged independently of the Main-CPU 1, the Sub-CPU 12 may be realized with relatively low costs.

Further, in the power-saving mode, the Sub-CPU 12 monitors a packet for sending, performs filtering processing, and/or returns the operation to that in the normal mode when a packet that satisfies a given condition is externally sent from the apparatus. The possibility for unnecessary return to the operation in the normal mode is reduced or suppressed and the operation in the power-saving mode can be maintained for a longer time as much as possible.

Therefore, power may be further effectively saved.

In addition, according to an example embodiment, in the above-mentioned filtering processing, the Sub-CPU receives the packet for the apparatus in the power-saving mode. When the Ethertype field in the DLC header of the received packet includes 0x0800, the packet is determined as the IPv4 one. When the IP version and the header length in the IP protocol header include 0x45, the packet is determined as an inspection target. On the other hand, when the IP version and the header length in the IP protocol header do not include 0x45, the packet is abandoned in the filter processing.

In addition, when the protocol field includes 50 or 51 in the inspection target, the packet is determined as an IP security packet and the processing corresponding to the IP security can be executed.

In addition, when the Sub-CPU receives the packet for the apparatus in the power-saving mode and the destination of the received packet is a Broadcast address, a Multicast address to be responded, which is notified in advance, or an IP address of the self apparatus, in the filtering processing, the packet is determined, as a processing target, without abandoning the packet. The packet excluding having, as the destination, the Broadcast address, the Multicast address, and the IP address is abandoned in the filtering processing.

In addition, when the Sub-CPU receives the packet for the apparatus in the power-saving mode and the Ethertype field in the DLC header of the packet includes 0x0806, the packet is determined, as an ARP packet. When the target address matches the IP address of the self apparatus, the mode is determined, as the collision of the IP addresses, and a response can be sent.

When the address on the sending side matches the target address, it is determined that the updating of the ARP table is requested and the processing is performed. When neither the collision of the IP addresses nor the updating request of the ARP table is determined, the packet is abandoned in the filtering processing.

In addition, when the Sub-CPU receives the packet for the apparatus in the power-saving mode and the Ethertype field in the DLC header of the received packet includes 0x86DD, the packet is determined as the IPv6 packet. The next header value can be determined.

When the next header value is 50 or 51, the packet is determined as the IP security packet. The processing corresponding to the IP security can be executed.

When the next header value is 58, the packet is determined as the ICMPv6 packet. The ICMP type can be determined.

When the ICMP type is 128 and the target address is an IP address of the self apparatus or a Multicast address to be responded, which is notified in advance, the processing continues. If not, the packet is abandoned in the filtering processing.

When the ICMP type is 130 and the Multicast address, serving as a search target, is −1 or is the Multicast address to be responded, which is notified in advance, the processing continues. If not, the packet is abandoned in the filtering processing.

When the ICMP type is 134, the packet is compared with the prefix information that is notified in advance. When the packet matches the prefix information, the packet is abandoned. If not, the processing continues in the filtering processing.

When the ICMP type is 135 and the target address is the IP address of the self apparatus, the processing continues. If not, the packet is abandoned in the filtering processing.

When the ICMP type is 136 and the target address is the IP address of the self apparatus or an ARP request flag is not set to the packet, the processing continues. If not, the packet is abandoned in the filtering processing.

When the Sub-CPU receives the packet for the apparatus in the power-saving mode, the Sub-CPU determines whether the Ethertype field in the DLC header of the received packet includes 0x0800 or less. When it is determined the Ethertype field includes 0x0800 or less, it is determined whether or not the frame of the packet matches a frame type which is notified in advance. When it is determined that the frame matches the frame type, predetermined processing of the matching packet is performed. The packet whose frame type does not match the above one is abandoned in the filtering processing.

In addition, with a function for returning the mode to the normal one when a timer value is preset and the set time passes after the shifting operation to the power-saving mode, at the expiration of the passage time set by the timer value, the operation can be returned to that in the normal mode of the Main-CPU 11.

Therefore, when the time in the power-saving mode is too long and a default can be caused, e.g., the Main-CPU 11 sets periodical processing, the mode can be returned to the normal mode after a given time.

Next, a description is given of an image processing system according to an example embodiment of the present invention. According to an example embodiment, the filtering processing in the power-saving mode further has a function for designating a value or range of address information for permitting the access and a function for designating a port number for permitting the access.

The same portions as those set forth above are not described again.

Figure 19:
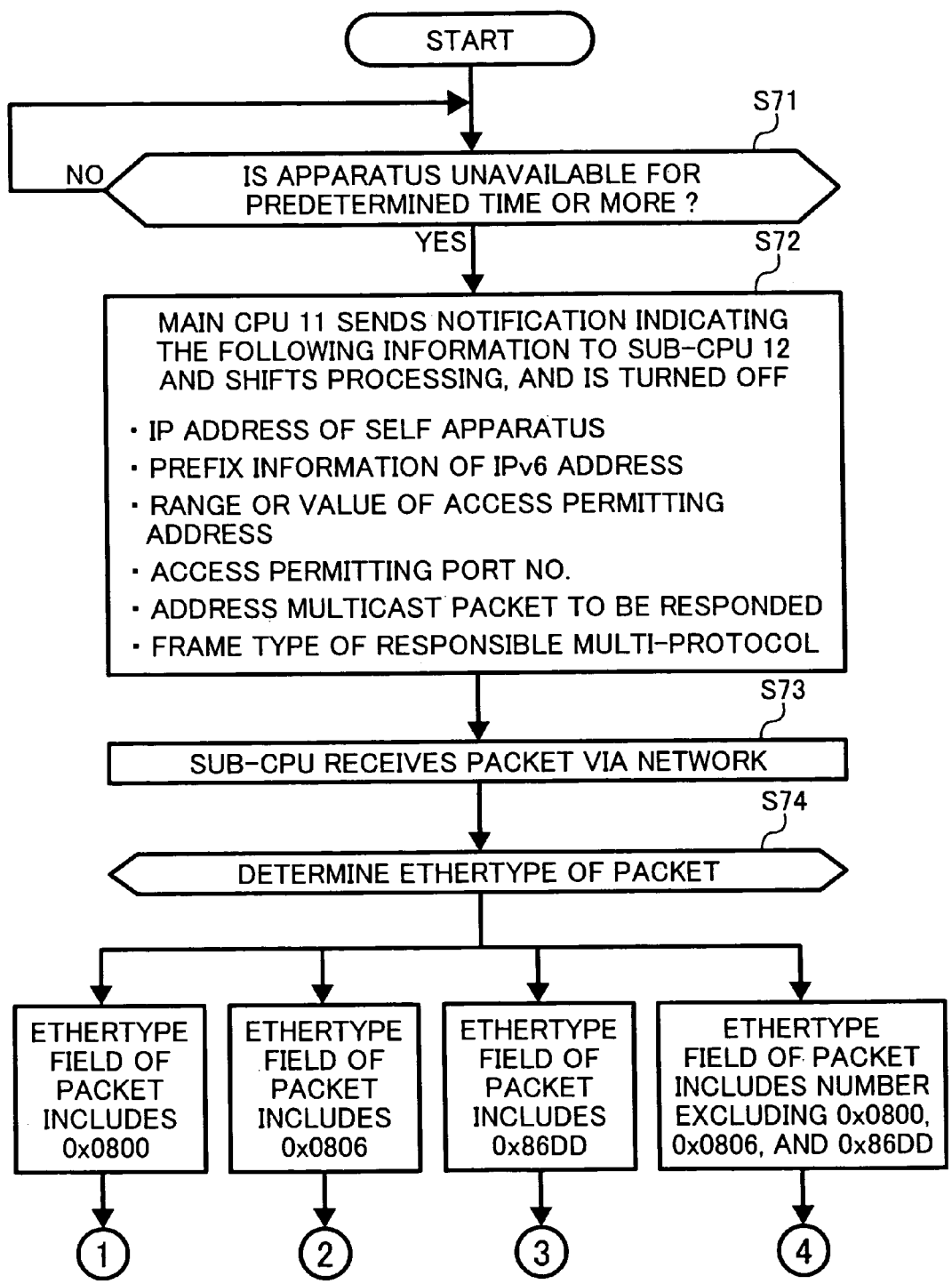
FIG. 19 is a flowchart showing shifting processing to a power-saving mode and Ethertype determining processing according to an example embodiment of the present invention.

First, a description is given of the shifting processing to the power-saving mode with reference to a flowchart shown in FIG. 19.

When the operation is not externally inputted to the apparatus for a preset time or more, the Main-CPU 11 determines that a transition condition to the power-saving mode is satisfied. The Main-CPU 11 starts the shifting processing to the power-saving mode (YES at S71).

The Main-CPU 11 sends data to the communication control unit 121 between Sub and Main from the communication control unit 112 between Main and Sub, as the shifting processing to the power-saving mode, thereby sending, to the Sub-CPU 12, a notification indicating the shifting operation to the power-saving mode and a notification indicating the following network control information. The Main-CPU 11 is turned off (at S72).

IP address of the self apparatus
Prefix information of IPv6 address
Range or value of access permitting address
Access permitting port number
Address of Multicast packet to be responded
Frame type of a responsive multi-protocol In the power-saving mode, similarly to the processing described above, the Sub-CPU 12 receives the packet from the PC 2 via the network 3 by the network communication control unit 123 (at S73), and the packet data processing unit 122 analyzes the Ethertype information in the DLC header shown in FIG. 3, of the received packet (at S74).

Figure 20:
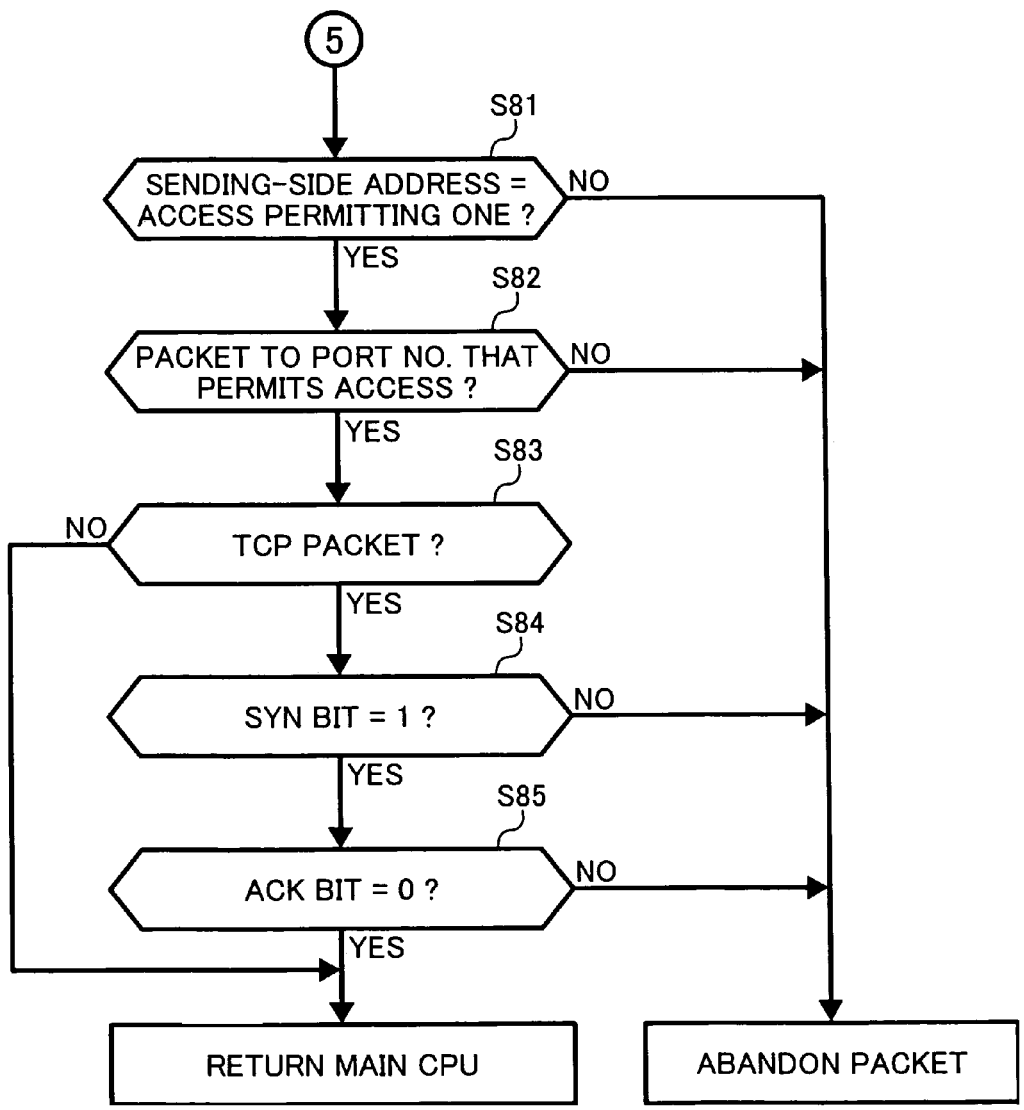
FIG. 20 is a flowchart showing a filter processing example in the power-saving mode according to the second embodiment.

Hereinbelow, a description is given of the operation for determining the destination address of the packet at S13 shown in FIG. 8 according to an example embodiment and the operation when the destination address is the same as that of the self apparatus with reference to FIG. 20.

When the destination address is the same as that of the self apparatus, the Sub-CPU 12 refers to the address on sending side. When the address on sending side is not one preset as the access permitting address, the packet is abandoned (at S81).

When the address on the sending side is one preset as the access permitting address, the Sub-CPU 12 refers to the port number. When the port number is not one without permitting the access, the packet is abandoned (at S82).

According to an example embodiment, the port number to which the access is permitted is notified to the hardware. On the hardware, it is checked to see if the port number is an access permitting port-number for well-known ports 0 to 1023.

Thus, even when a port is attacked from a malicious user, the filtering processing can be performed by the check operation without wasting software resources.

When the port is an access permitting one, the Sub-CPU 12 refers to the protocol field in the IPv4 header, and it is determined whether or not the protocol field includes "6" indicating the TCP packet (at S83). When it is determined that the packet is not the TCP one, the Main-CPU 11 is returned to the normal mode and receives the packet.

When the packet is the TCP one, the Sub-CPU 12 determines whether or not the SYN bit is 1. When it is determined that the SYN bit is not 1, the packet is abandoned (at S84).

When it is determined that the SYN bit is 1, the Sub-CPU 12 determines whether or not the ACK bit is 0. When it is determined that ACK bit is not 0, the packet is abandoned (at S85).

When the packet includes the SYN bit of 1 and the ACK bit of 0, the Main-CPU 11 is returned to the normal mode and the Main-CPU 11 receives the packet.

According to an example embodiment, in addition to the above-mentioned functions, such a function may be provided that the mode is returned to the normal one by setting a timer value in advance when the setting time passes after the shifting operation to the power-saving mode.

As mentioned above, according to an example embodiment of the present invention, the same advantages as those according discussed above are obtained. Further, in the filtering processing, the Sub-CPU receives the packet for the apparatus in the power-saving mode, and the processing target is only the packet from the access permitting address notified in advance in step S72 from the Main-CPU 11. Further, the filtering processing using the "access control" for abandoning the packet that is not the processing target can be performed.

In addition, the Sub-CPU receives the packet for the apparatus in the power-saving mode, and the processing target is only the packet to the access permitting port number notified in advance at S72 from the Main-CPU 11. The packet that is not the processing target is abandoned in the filtering processing.

In the filtering processing using the port number, not the Sub-CPU 12 but the hardware specifically-arranged checks the preset well-known port. Therefore, even when the port is attacked from a malicious user, the filtering processing can be performed by the check operation without wasting software resources.

Next, a description is given of an image processing system according to an example embodiment of the present invention. According to an example embodiment, in addition to the packet monitoring function in the power-saving mode described above, such a setting function is further added that the mode is returned to the normal one by the state change of a USB terminal (external-device connecting device).

The same portions as those set forth above are not described again.

Figure 21:
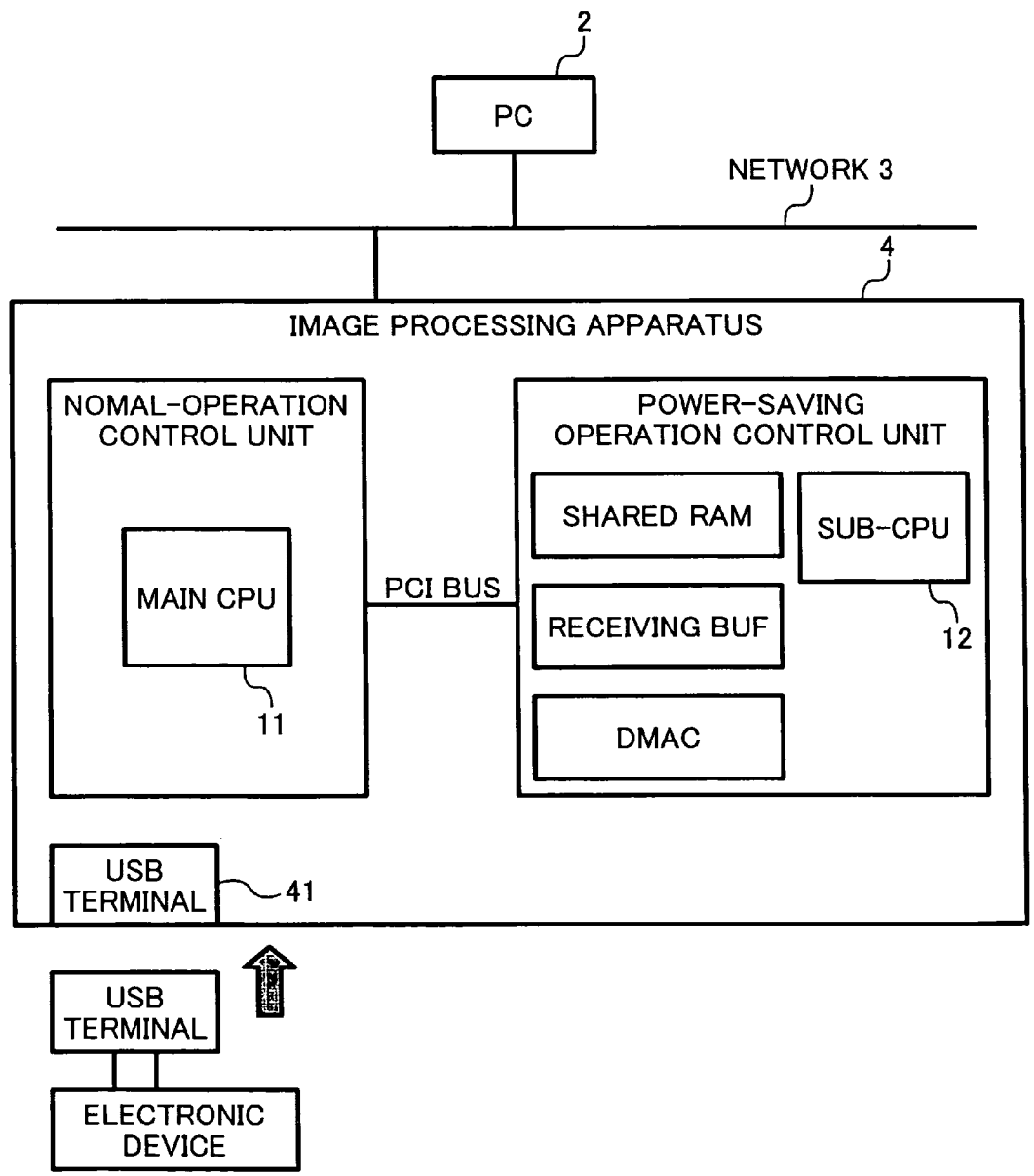
FIG. 21 is a block diagram showing a structure example of an image processing system according to an example embodiment of the present invention.

Referring to FIG. 21, an image processing apparatus 4 according to an example embodiment of the present invention further includes a USB terminal 41 that can connect/disconnect an electronic device external to the image processing apparatus 4 while the image processing apparatus 4 is turned on, in addition to the structure of the image processing apparatus described above. Further, the image processing apparatus 4 is connected to the PC 2 via the network 3.

Figure 22:
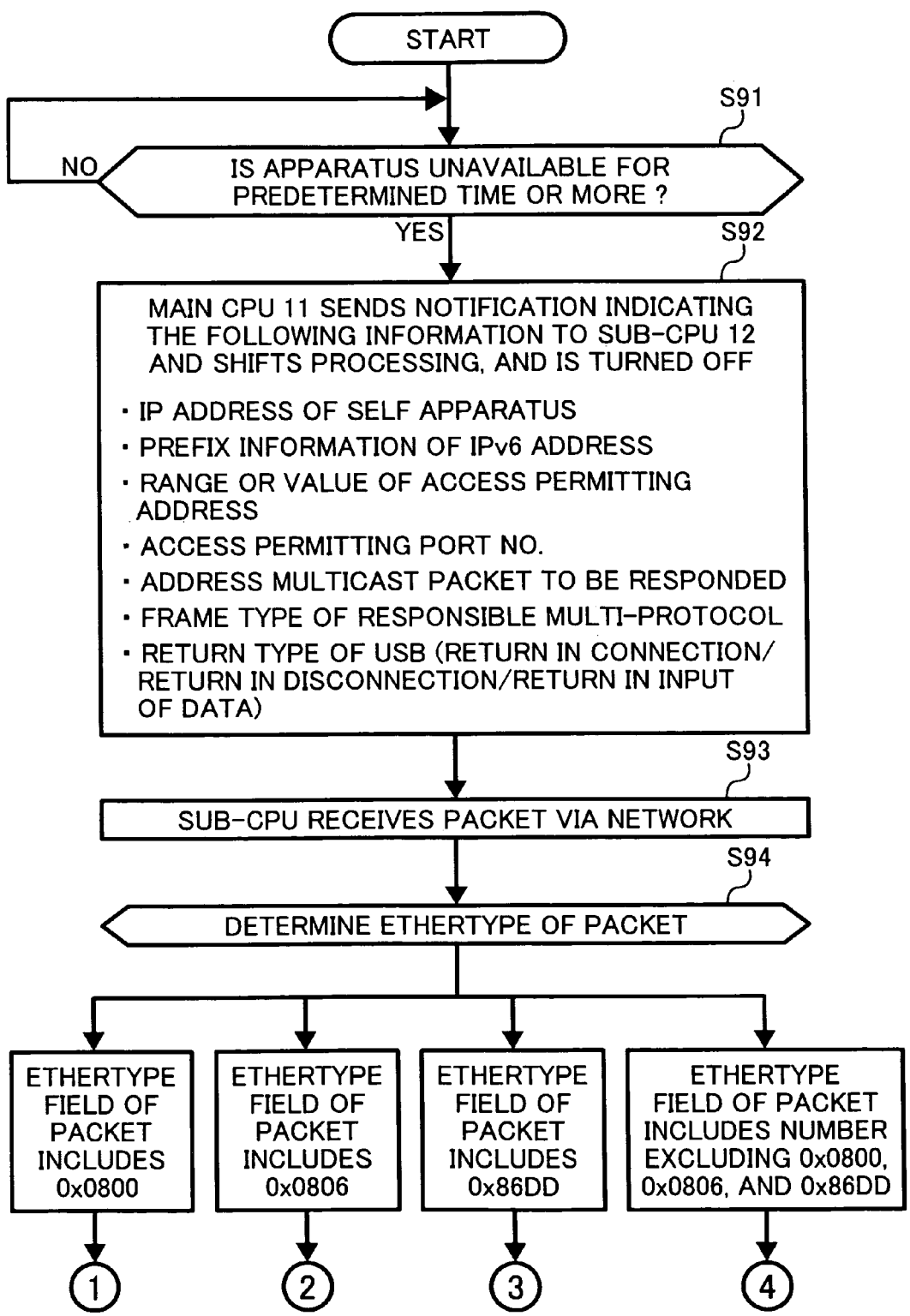
FIG. 22 is a flowchart showing shifting processing to a power-saving mode and Ethertype determining processing according to an example embodiment.

Next, a description is given of shifting processing to the power-saving mode of the image processing apparatus 4 according to an example embodiment with reference to a flowchart shown in FIG. 22.

The Main-CPU 11 determines that a transition condition to the power-saving mode is satisfied when the operation is not externally inputted to the apparatus for a given time or more, and starts the shifting processing to the power-saving mode (YES at S91).

The Main-CPU 11 sends data to the communication control unit 121 between Sub and Main from the communication control unit 112 between Main and Sub, as the shifting processing to the power-saving mode, thereby sending a notification indicating the transition to the power-saving mode to the Sub-CPU 12 and a notification indicating the following network control information. Further, the Main-CPU 11 is shut off (at S92).

IP address of the self apparatus
Prefix information of the IPv6 address
Range or value of the access permitting address
Access permitting port number
Address of Multicast packet to be responded
Frame type of the responsive multi-protocol
Return type of USB (return in connection/return in disconnection/return in data input)

As mentioned above, in the power-saving mode, similarly to the processing according to the second embodiment, the Sub-CPU 12 receives the packet sent from the PC 2 via the network 3 by the network communication control unit 123 (at S93), and the packet data processing unit 122 analyzes the Ethertype field information in the DLC header shown in FIG. 3 of the received packet (at S94).

Figure 23:
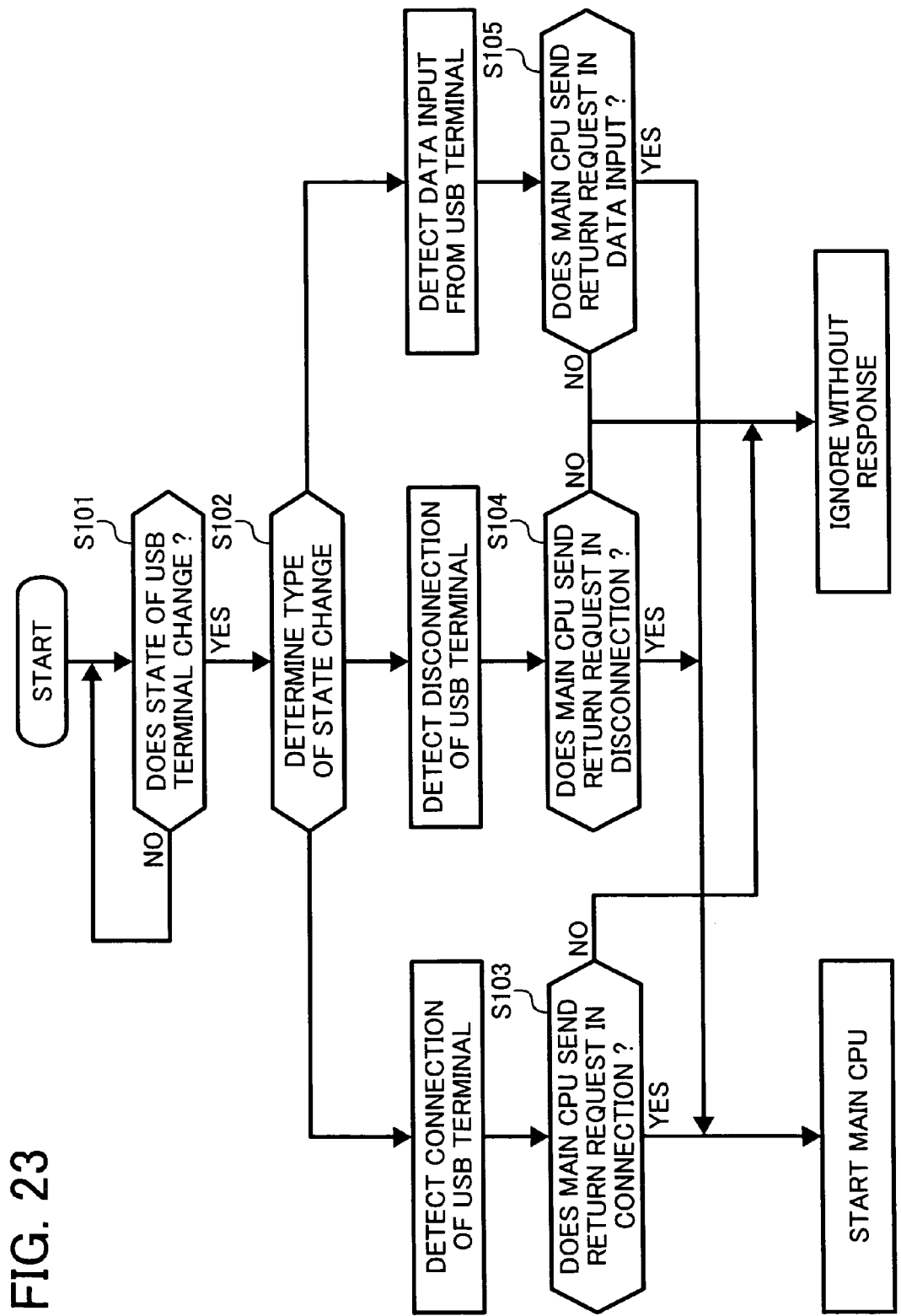
FIG. 23 is a flowchart showing an operating example in a response of the state change of a USB terminal according to an example embodiment.

Next, a description is given of the operation for return processing from the power-saving mode on the basis of the change in connection to the USB terminal 41 in the image processing apparatus 4 according to an example embodiment with reference to FIG. 23.

The Sub-CPU 12 monitors whether or not the connection to the USB terminal 41 is changed in the power-saving mode (at S101). When the Sub-CPU 12 detects the change in connection to the USB terminal 41, the Sub-CPU 12 determines how the connection to the USB terminal 41 is changed (at S1102).

When it is determined that the connecting change indicates a new connection of an electronic device having the USB terminal, it is determined whether or not the return is requested in the connection to the USB terminal, as the return type of the USB sent from the Main-CPU 11 at S92 (at S1103). When the return request is sent in the connection to the USB terminal, the Main-CPU 11 is returned to the normal mode. When the return request is not sent, the state change is ignored.

When it is determined that the state change indicates the disconnection the USB terminal, the Main-CPU 11 determines whether or not the return request is sent in the disconnection of the USB terminal, as the return type of the USB sent at S92 (at S104). When the return request is sent in the disconnection of the USB terminal, the Main-CPU 11 is returned to the normal mode. When the return request is not sent, the state change is ignored.

When it is determined that the state change indicates the data is inputted via the USB terminal from an external electronic device, it is determined whether or not the return request is sent in the data input via the USB terminal from the Main-CPU 11, as the return type of the USB sent at S92 (at S105). When the return request is sent in the data input via the USB terminal, the Main-CPU 11 is returned to the normal mode. When the return request is not sent, the state change is ignored.

Further, according to an example embodiment, similar to the description set forth above, such a return function may be provided, in addition to the above functions, that a timer value is set in advance and the mode is returned to the normal one when the setting time passes after the transition to the power-saving mode.

As mentioned above, according to an example embodiment of the present invention, the same advantages as those set forth above are obtained. Further, when the change of the connection to the USB terminal 41 satisfies the preset condition, it is possible to control the return operation for returning to the normal mode from the power-saving mode.

As mentioned above, when an electronic device is connected to the USB terminal in the power-saving mode, the USB return type that is notified in advance is determined. When the return request in the connection of the USB terminal is sent, the mode can be returned to the normal mode of the Main-CPU.

Upon disconnecting the electronic device connected to the USB terminal in the power-saving mode, the USB return type that is notified in advance is determined. When the return request in the disconnection of the electronic device is sent, the mode can be returned to the normal mode of the Main-CPU.

Further, upon receiving the data from the electronic device connected to the USB terminal in the power-saving mode, the USB return type that is notified in advance is determined. When the return request in the input of the data is sent, the mode can be returned to the normal one of the Main-CPU.

As mentioned above, according to an example embodiment of the present invention, in the connection of the USB terminal of a digital camera with the USB connecting function, it is possible to set, as the function of the Main-CPU 11 in the normal mode, the return timings to the normal mode including the return to the normal mode at the connecting timing, the return to the normal mode at the sending timing of the data, or the return to the normal mode at the pull-out timing.

The above-mentioned embodiments are example ones according to the present invention. The present invention is not limited to those and can be variously modified and modified on the basis of the technological essentials of the present invention.

For example, according to an example embodiment, the PC 2 is on the transmitting side of the packet to the image processing apparatus. However, the transmitting side of the packet via the network 3 is not limited to this and an arbitrary electronic device that can communicate data by the connection to the network 3 may be applied.

Further, according to an example embodiment, when a given time or more passes while the operation is not inputted, the mode shifts to the power-saving mode. The trigger of the transition to the power-saving mode is not limited to this. For example, an operating unit need not input the operation for a given time or more, and various cases may be applied.

According to an example embodiment, the image processing apparatus 1 realizes various image processing functions, e.g., reads the image, sends the read image via a FAX machine, prints-out the received image, receives and sends an email, and copies the image. The image processing apparatus with the function for communication control connected to a network is not limited to the image processing apparatus 1. For example, the image processing apparatus may be a network printer, a network scanner, a copy machine, or a FAX machine.

Further, the communication control apparatus according to an example embodiment of the present invention is applied to the image processing apparatus, and the communication control system according to an example embodiment of the present invention is applied to the image processing system. A communication control apparatus having a shifting function to the power-saving mode and a function for communication via the network is not limited to the above communication control apparatus. Example embodiments of the present invention can be applied to various communication control apparatus.

Furthermore, the processing sequence for realizing the image processing system according to an example embodiment is recorded to a recording medium, serving as a program. As a consequence thereof, the program supplied from the recording medium realizes the above-mentioned functions according to the embodiments of the present invention by enabling a CPU of a computer forming the image processing system to perform the processing.

Example embodiments of the present invention can be applied to the case in which the recording medium or an external recording medium via the network supplies information including the programs to an output apparatus.

That is, the program code read from the recording medium realizes a new function according to an example embodiment of the present invention, and the recording medium that stores the program code and a signal read from the recording medium may realize the present invention.

The recording medium may be, e.g., a floppy (registered trademark) disc, a hard disk, an optical disk, a magnet-optical disk, a CD-ROM, a CD-R, magnetic tape, a non-volatile memory card, a ROM, or an EEPROM.

The image processing system controlled under the program realizes the functions of the image processing system according to an example embodiment of the present invention.

What is claimed is:

1. A communication control apparatus for shifting a mode to a power-saving mode where power consumption is less than that in a normal mode, the communication control apparatus comprising:
   a normal-operation controller that controls operation in a normal mode, the normal-operation controller being configured to send, to a power-saving controller, determining information to be used for determining a return condition from the power-saving mode; and
   the power-saving controller, arranged independently from the normal-operation controller, the power-saving controller controlling the operation of the communication control apparatus in the power-saving mode such that the power consumption is lower than in the normal mode.

2. The communication control apparatus according to claim 1, wherein the power-saving controller monitors a packet for sending so as to control the return operation for return the operation in the power-saving mode to that in the normal mode upon externally sending a packet that satisfies a given condition outside the apparatus, as the control operation at the minimum level determined as the operation in the power-saving mode.

3. The communication control apparatus according to claim 2, wherein the monitoring of the received packet by the power-saving controller determines whether or not address information on a sending side for sending the packet is included in a given value or range, and the packet is abandoned when the address information is not included in the given value or range.

4. The communication control apparatus according to claim 1, further comprising:
   an external-device connecting unit that enables connection/disconnection of an electronic device external to the apparatus when the communication control apparatus is turned on,
   wherein the power-saving controller monitors the connection of the external-device connecting unit so as to control the return operation for returning the power-saving mode to the normal mode when the change in connection to the external-device connecting unit satisfies a given condition, as the control operation at the minimum level determined as the operation in the power-saving mode.

5. The communication control apparatus according to claim 1, wherein the power-saving controller sends, as the return control for returning the power-saving mode to the normal mode, return-reason specifying information and a packet, as a return trigger, to the normal-operation controller.

6. A communication control system coupled to a network, comprising:
   the communication control apparatus according to claim 1; and
   an operating device coupled to the network and configured to communicate and manipulate the communication control apparatus via the network.

7. A communication control apparatus for shifting a mode to a power-saving mode where power consumption is less than that in a normal mode, the communication control apparatus comprising:
   a normal-operation controller that controls operation in a normal mode; and
   a power-saving controller, arranged independently from the normal-operation controller, the power-saving controller controlling the operation of the communication control apparatus in the power-saving mode such that the power consumption is lower than in the normal mode, wherein
   the normal-operation controller sends, to the power-saving controller, determining information to be used for determining a return condition from the power-saving mode in the shifting operation to the power-saving mode.

8. A power-saving control method, comprising:
   shifting an operation mode, upon satisfying a given condition, to a power-saving mode controlled by a power-saving controller for suppressing the power consumption to the level thereof lower than that in a normal mode controlled by a normal-operation controller arranged independently of the power-saving controller, the normal-operation controller sending, to the power-saving controller, determining information that is used for determining a return condition from the power-saving mode; and
   turning off a control of the normal-controller.

9. The power-saving control method according to claim 8, further comprising:
   monitoring a packet for sending so that the power-saving controller controls the return operation for returning power-saving mode to the normal mode when a packet that satisfies a given condition is externally sent, after the shifting.

10. The power-saving control method according to claim 9, wherein the monitoring determines whether or not address information on a sending side for sending the packet is included in a given value or range, and abandons the packet when the address information is not included in the given value or range.

11. The power-saving control method according to claim 8, further comprising:
    monitoring a connection of an external-device connecting unit that enables connection/disconnection of an external electronic device so that the power-saving controller controls the return operation for returning the operation in the power-saving mode to the operation in the normal mode when the change in the connection to the external-device connecting unit satisfies a given condition, after the shifting.

12. The power-saving control method according to claim 8, further comprising:

sending return-reason specifying information and a packet, as triggers of the return, to the normal-operation controller by the power-saving controller when the power-saving mode is returned to the normal mode after the shifting.

13. A computer readable medium for a communication control apparatus including a power-saving controller, independently of a normal-operation controller for controlling the operation in a normal mode, the computer readable medium comprising:

a first code segment instructing a computer to shift an operation mode, upon satisfying a given condition, to a power-saving mode controlled by the power-saving controller for reducing the power consumption to a level thereof lower than that in a normal mode controlled by the normal-operation controller arranged independently of the power-saving controller, the normal-operation controller sending, to the power-saving controller, determining information that is used for determining a return condition from the power-saving mode; and a second code segment instructing the computer to turn off a control of the normal-operation controller.

* * * * *